(12) United States Patent
Tamai et al.

(10) Patent No.: US 6,545,230 B2
(45) Date of Patent: Apr. 8, 2003

(54) COMBINATIONAL WEIGHING OR COUNTING APPARATUS

(75) Inventors: Yutaka Tamai, Kurita-gun (JP); Kazufumi Naito, Kurita-gun (JP); Toshiro Ono, Akashi (JP); Hirofumi Yamamori, Akashi (JP)

(73) Assignee: Ishida Co., Ltd., Kyoto (JP)

( * ) Notice: Subject to any disclaimer, the term of this patent is extended or adjusted under 35 U.S.C. 154(b) by 137 days.

(21) Appl. No.: 09/801,809

(22) Filed: Mar. 9, 2001

(65) Prior Publication Data

US 2001/0020553 A1 Sep. 13, 2001

(30) Foreign Application Priority Data

Mar. 13, 2000 (JP) ........................................ 2000-067931

(51) Int. Cl.[7] .................. G01G 19/387; G01G 13/00
(52) U.S. Cl. .................. 177/25.18; 177/121; 222/77
(58) Field of Search .................. 177/25.18, 121; 222/55, 56, 77

(56) References Cited

U.S. PATENT DOCUMENTS

| | | | |
|---|---|---|---|
| 3,957,126 A | | 5/1976 | Hobart ........................ 177/121 |
| 4,397,364 A | * | 8/1983 | Hirano ..................... 177/25.18 |
| 4,615,403 A | * | 10/1986 | Nakamura ............... 177/25.18 |
| 4,708,215 A | * | 11/1987 | Nakamura et al. ........ 177/25.18 |
| 5,074,436 A | * | 12/1991 | Inoue ....................... 177/25.18 |
| 5,756,939 A | | 5/1998 | Taniguchi ................. 177/25.18 |

FOREIGN PATENT DOCUMENTS

| | | |
|---|---|---|
| EP | 0 152 923 A2 | 8/1985 |
| GB | 2 302 950 A | 2/1997 |
| JP | 5256682 A * 10/1993 | .............. 177/25.18 |
| JP | 09-329484 A | 12/1997 |

* cited by examiner

Primary Examiner—Randy W. Gibson
(74) Attorney, Agent, or Firm—Shinjyu Global IP Counselors, LLP

(57) ABSTRACT

A combinatorial weighing or counting apparatus having a dispensing feeder and weighing hoppers is provided to achieve superior article transport by suitably controlling the operating parameter of the dispensing feeder. The combinatorial weighing or counting apparatus of the present invention includes a dispensing feeder 4, a plurality of weighing hoppers 7, a weighing device 11, and a DF operating parameter calculating unit 22. Articles to be weighed are supplied to the dispensing feeder 4. From the dispensing feeder 4 the articles are supplied to the weighing hoppers 7. The weighing device 11 is a means for detecting the weight of the articles on the dispensing feeder 4. The DF operating parameter calculating unit 22 is a means for controlling the amount of articles that are discharged from the dispensing feeder 4, based on weight information from the weighing device 11.

19 Claims, 6 Drawing Sheets

COMBINATIONAL WEIGHING OR COUNTING APPARATUS

BACKGROUND OF THE INVENTION

1. Field of the Invention

This invention generally relates to a combinational weighing or counting apparatus. More specifically, the present invention relates to a combinational weighing or counting apparatus used to weigh with high speed precision articles whose individual weight varies.

2. Background Information

Combinational weighing or counting apparatuses are commonly used to weigh with high speed and precision articles whose individual weight varies, such as sweets or fruits. A combinational weighing or counting apparatus includes, for example, a dispensing feeder shaped like a round table, a plurality of radial feeders (discharge troughs) arranged around the dispensing feeder, and a plurality of weighing hoppers arranged below the radial feeders. The dispensing feeder and the radial feeders can transport articles by electromagnetically induced vibration. The dispensing feeder and the weighing hoppers are each provided with a weighing device (load cell) for measuring the weight of the articles on them.

When a supply device including, for example, a transport conveyor supplies articles to be weighed onto the dispensing feeder, the dispensing feeder transports the articles by vibration in the radial direction while dispensing them in the circumferential direction, and discharges them onto the radial feeders. Then, the radial feeders transport the articles by vibration in the radial direction, and supply them to pooling hoppers. The pooling hoppers temporarily store the articles, and then load them into the weighing hoppers. A combination control means calculates combinations of the weight of the articles loaded into the weighing hoppers from the weight determined by the weighing devices, and selects weighing hoppers, whose combined weight is within the tolerance range. Then, the selected weighing hoppers are opened, and a predetermined amount of the articles is supplied to the devices downstream.

The transported amount of articles supplied to the weighing hoppers from the feeders is adjusted by renewing an operating parameter (vibration time and/or amplitude) of each feeder in accordance with the increase or decrease of the desired weight in the weighing hoppers. As a result, the operating parameters are adjusted such that the weight of the articles in the weighing hoppers approaches the desired weight, and the combined weight approaches the target value.

The supply/stop of the articles to the dispensing feeder from the supply device is determined depending on the weight of the articles accumulated on the dispensing feeder. More specifically, after a predetermined weight of articles has been supplied, the supply device stops supplying articles. The next supply step starts only after the weight of the articles accumulated on the dispensing feeder has dropped below a predetermined minimum weight.

With such a combinational weighing or counting apparatus, the amount of articles supplied to the weighing hoppers from the feeders has to be stabilized in order to increase the weighing precision.

However, in conventional apparatuses, the operating parameters (vibration time and/or amplitude) of the dispensing feeder and the radial feeders are feedback-controlled based on the weight in the weighing hoppers. The amount of articles supplied to the weighing hoppers is determined mainly by the vibration of the radial feeders, but it is also necessary to control the dispensing feeder so as to suitably supply the articles over the entire transport path. Since the control of the operating parameter of the dispensing feeder is based only on the weight in the weighing hoppers, the following problems occur:

Firstly, since the dispensing feeder to be controlled is furthest upstream in the transport path and the weighing hoppers serving as the sensors are furthest downstream, the responsiveness with which the transporting of the articles can be controlled at the dispensing portion is low. Therefore, when the desired amount of articles is not transported into the weighing hoppers, it takes a relatively long time_the apparatus to adjust and transport the desired amount of articles into the weighing hoppers Secondly, radial feeders, which are controlled separately, are arranged between the dispensing feeder to be controlled and the weighing hoppers serving as the sensors. Thus, optimum control of the dispensing feeder is difficult. That is to say, when the weight in the weighing hoppers varies, it is sometimes difficult to tell whether the reason for this is the dispensing feeder or one of the radial feeders.

In view of the above, there exists a need for a combinational weighing or counting apparatus which overcomes the above mentioned problems in the prior art. This invention addresses this need in the prior art as well as other needs, which will become apparent to those skilled in the art from this disclosure.

SUMMARY OF THE INVENTION

It is an object of the present invention to provide a combinatorial weighing or counting apparatus having a dispensing feeder and weighing hoppers, that achieves superior article transport by suitably controlling the operating parameter of the dispensing feeder.

According to a first aspect of the present invention, a combinational weighing or counting apparatus includes a dispensing portion, a plurality of weighing hoppers, a weight detection means, and a control means. Articles to be weighed are supplied to the dispensing portion. From the dispensing portion the articles are supplied to the plurality of weighing hoppers. The weight detection means detects the weight of the articles on the dispensing portion. The control means controls the amount of articles that discharged from the dispensing portion, based on weight information from the weight detection means. With this combinational weighing or counting apparatus, the amount of articles discharged from the dispensing portion is controlled with the weight detection means. The weight detection means is provided for the dispensing portion as a sensor, so that the dispensing portion can be controlled suitably. Thus, superior transport control of the weighed articles is possible with no or only little time lag.

According to a second aspect of the present invention, in a combinational weighing or counting apparatus as in the first aspect, the control means calculates the amount of articles that is discharged from the dispensing portion using the weight information from the weight detection means. The control means controls the amount of articles that is discharged from the dispensing portion, based on this discharge amount. With this combinational weighing or counting apparatus, the amount of articles discharged from the dispensing portion is controlled based on the amount of articles discharged from the dispensing portion. Therefore, the dispensing portion can be controlled suitably, and superior transport control is possible.

According to a third aspect of the present invention, in a combinational weighing or counting apparatus as in the first or second aspect, the control means controls the amount of articles that is discharged from the dispensing portion, based on the weight information while the supply of the articles onto the dispensing portion is stopped. With this combinational weighing or counting apparatus, the weight information is used while the supply of the articles onto the dispensing portion is stopped. Therefore, a precise amount of discharged articles can be obtained. As a result, it becomes possible to control suitably the dispensing portion and superior transport control is possible.

According to a fourth aspect of the present invention, in a combinational weighing or counting apparatus as in any of the first to third aspects, the control means controls the amount of articles that is discharged from the dispensing portion, based on weight information from the weighing hoppers, in addition to the weight information from the weight detection means. With this combinational weighing or counting apparatus, the weight information from the downstream weighing hoppers can be taken into consideration when controlling the discharge amount from the dispensing feeder. Therefore, it is possible to control suitably the amount of articles discharged from the dispensing feeder in accordance with the transport situation of the articles further downstream.

According to a fifth aspect of the present invention, in a combinational weighing or counting apparatus as in any of the first to fourth aspects, the control means controls the amount of articles that is discharged from the dispensing portion, based on weight information from the weight detection means for each weighing cycle. Here, "weighing cycle" means not only cycles in the combinational weighing or counting apparatus (loading of articles to be weighed—weighing with the various weighing hoppers—combination calculation—storing of combination weights—discharge), but also includes the cycles per weighing hopper (loading of articles to be weighed—weighing—sending weight to control means—combination calculation—discharge). With this combinational weighing or counting apparatus, the dispensing portion is controlled per cycle period, thereby enabling a finely tuned control adapted to the present state.

According to a sixth aspect of the present invention, a combinational weighing or counting apparatus as in any of the first to fifth aspects further includes a supply device supplies articles to the dispensing portion. Further, the control means controls the supply device based on weight information from the weight detection means. With the combinational weighing or counting apparatus of the present invention, the amount supplied from the supply device is controlled in addition to the suitable control of the dispensing portion. Therefore, the transporting of articles in the dispensing portion can be controlled even further.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
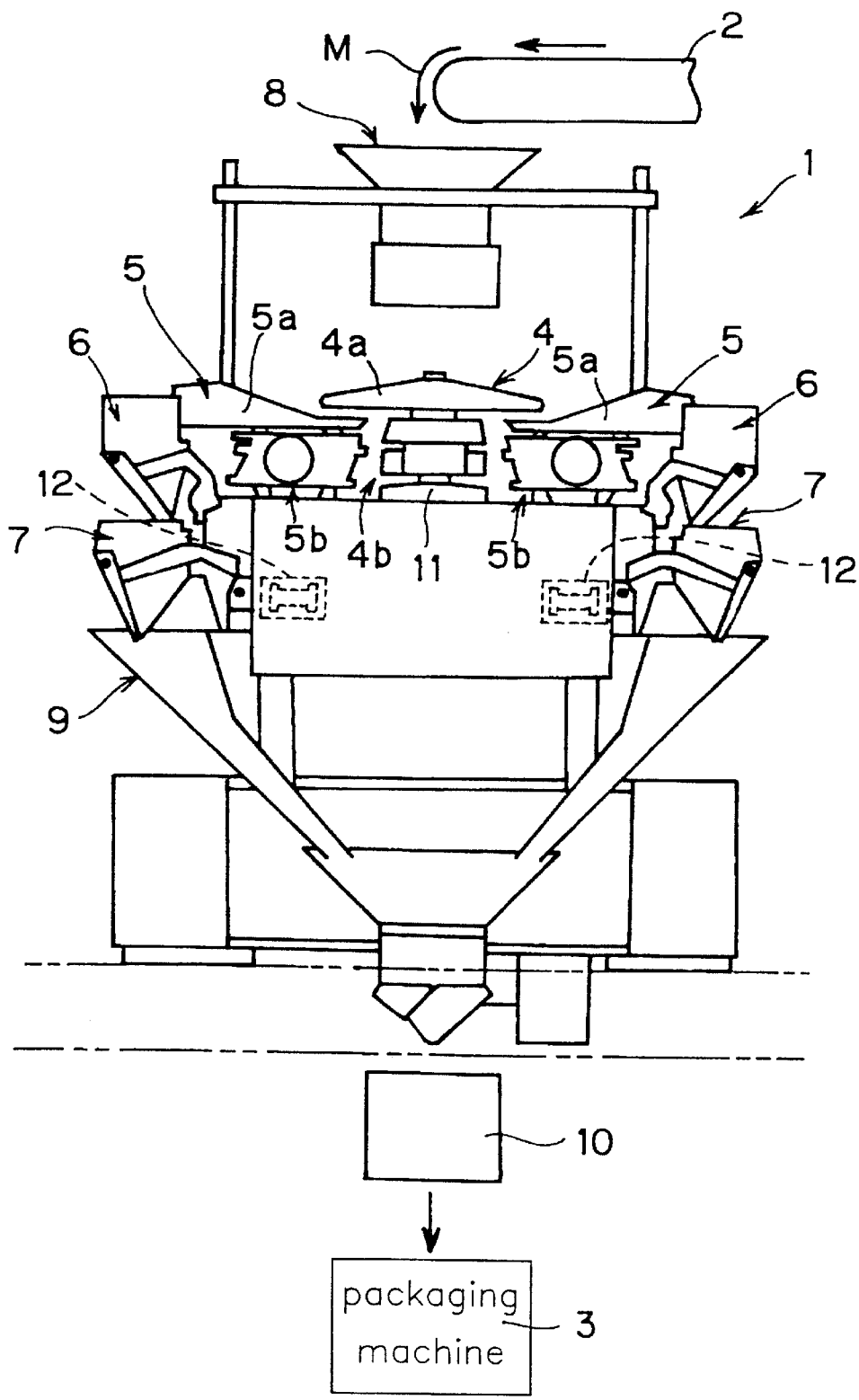
FIG. 1 is a schematic diagrammatical view of the combinational weighing or counting apparatus in accordance with a first embodiment of the present invention.

FIG. 1 shows a combinational weighing or counting apparatus 1 in accordance with an embodiment of the present invention. This combinational weighing or counting apparatus 1 discharges suitable amounts of articles that are supplied from a supply device 2, for example a feeder or a belt conveyor, into a packaging machine 3. An amount is determined to be suitable by combination weighing. The combinational weighing or counting apparatus 1 includes a dispensing feeder 4, a plurality of radial feeders 5 arranged around the dispensing feeder 4, a plurality of pooling hoppers 6 arranged around the radial feeders 5, and a plurality of weighing hoppers 7 arranged underneath the pooling hoppers 6. The combinational weighing or counting apparatus 1 further includes a supply chute 8 above the dispensing feeder 4, a collection chute 9 arranged below the weighing hoppers 7, and a discharge chute 10 arranged below the collection chute 9.

The dispensing feeder 4 includes a table 4a having a substantially cone-shaped upper surface and an electromagnetic vibration unit 4b made of an electromagnetic coil and a spring arranged below the table 4a. More precisely, the table 4a is supported at its base by parallel plate springs, and the base is supported on a ground plane by a plurality of springs. The electromagnetic coil of the electromagnetic vibration unit 4b is provided inside the base, and when current is supplied to the electromagnetic coil, it generates a magnetic force, pulling in the table 4a. When current is supplied to the electromagnetic coil, the table 4a descends while turning counterclockwise. When the current is interrupted, the restoring force of the plate springs pushes the table 4a back up while turning it clockwise. Due to the vibration that is brought about by repeating this process, the transported articles are moved in a radial direction, while dispensing them in the circumferential direction along the inclined surface of the table 4a. The dispensing feeder 4 is provided with a weighing device (load cell) 11 for measuring the weight of the transported articles on the table 4a.

The radial feeders 5 include a trough unit 5a and an electromagnetic vibration unit 5b made of an electromagnetic coil and a plate spring, for example, arranged below the trough unit 5a. The configuration of the electromagnetic vibration unit 5b is substantially the same as that of the electromagnetic vibration unit 4b of the dispensing feeder 4. When the radial feeders 5 are repeatedly vibrated, the transported articles on the trough units 5a are moved outward in the radial direction.

After the articles supplied from the radial feeder 5 have been temporarily pooled in the pooling hoppers 6 in accordance with the weighing of the articles, discharge gates of the pooling hoppers 6 are opened, and the transported articles are deposited into the corresponding weighing hoppers 7.

The weighing hoppers 7 weigh the articles loaded into them from the pooling hoppers 6. Each of the weighing hoppers 7 is provided with a weighing device (load cell) 12. A combination control means (not shown in the drawings) calculates combinations of the weight of the articles in each weighing hopper 7, and selects weighing hoppers 7 whose combined weight is within the tolerance range. Then the discharge gate of the selected weighing hoppers 7 is opened, and articles of a predetermined weight are discharged through the collection chute 9 and the discharge chute 10.

Figure 2:
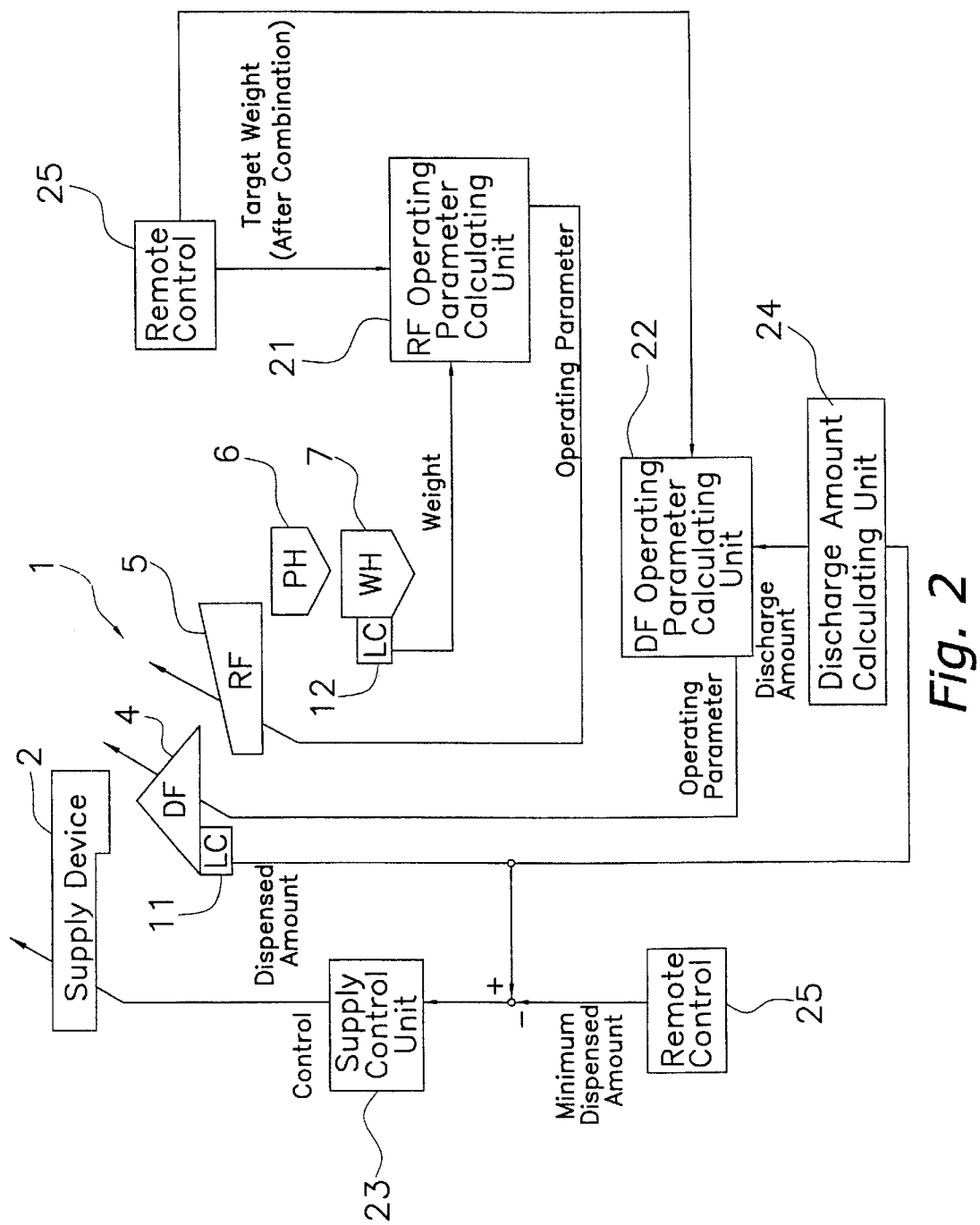
FIG. 2 is a control diagrammatical view of the combinational weighing or counting apparatus in accordance with the first embodiment of the present invention.

FIG. 2 is a diagram showing the control system of the combinational weighing or counting apparatus 1 of the present invention. This control system mainly includes an RF (radial feeder) operating parameter calculating unit 21, a DF (dispensing feeder) operating parameter calculating unit 22, and a supply control unit 23. The RF operating parameter calculating unit 21 calculates the operating parameter of the radial feeders 5 based on the weight information from the weighing devices 12 and the target weight after combination entered by a remote control 25. The DF operating parameter calculating unit 22 calculates the operating parameter of the dispensing feeder 4 based on the weight information from the weighing device 11 and the target weight after combination entered by the remote control 25. A discharge amount calculating unit 24 detects the weight from the weighing device 11 for each weighing cycle while the supply of transported articles from the supply device 2 is stopped, and, calculating the difference, passes the amount discharged by the dispensing feeder 4 at each weighing cycle to the DF operating parameter calculating unit 22.

The supply control unit 23 receives the difference between the weight information from the weighing device 11 and the minimum dispensed amount input by the remote control 25, and turns the supply device 2 on or off depending on this difference. When the supply device 2 has supplied a predetermined amount of articles to the dispensing feeder 4, it does not supply any more articles until the dispensed amount is lower than the minimum dispensed amount. Thus, the supply device 2 is alternately in a supply mode and a stopping mode.

Figure 3:
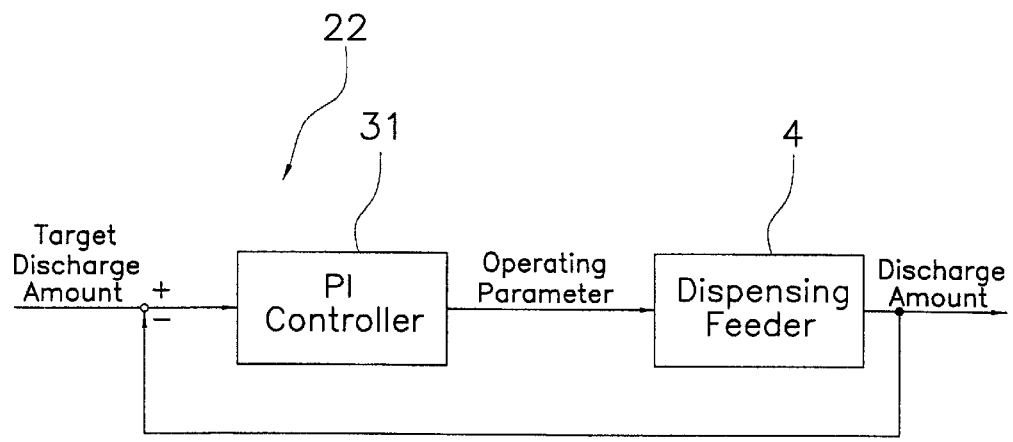
FIG. 3 is a control diagrammatical view of a DF operating parameter calculating unit in accordance with the first embodiment of the present invention.
Figure 4:
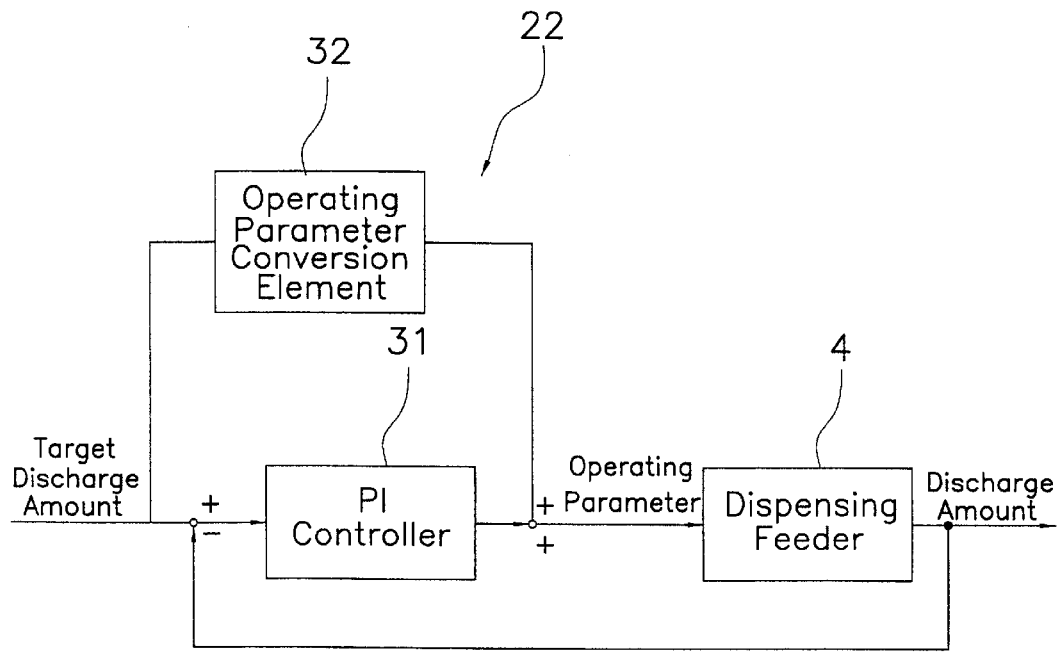
FIG. 4 is a control diagrammatical view of the DF operating parameter calculating unit of FIG. 3 with an Operating Parameter Conversion Element.
Figure 5:
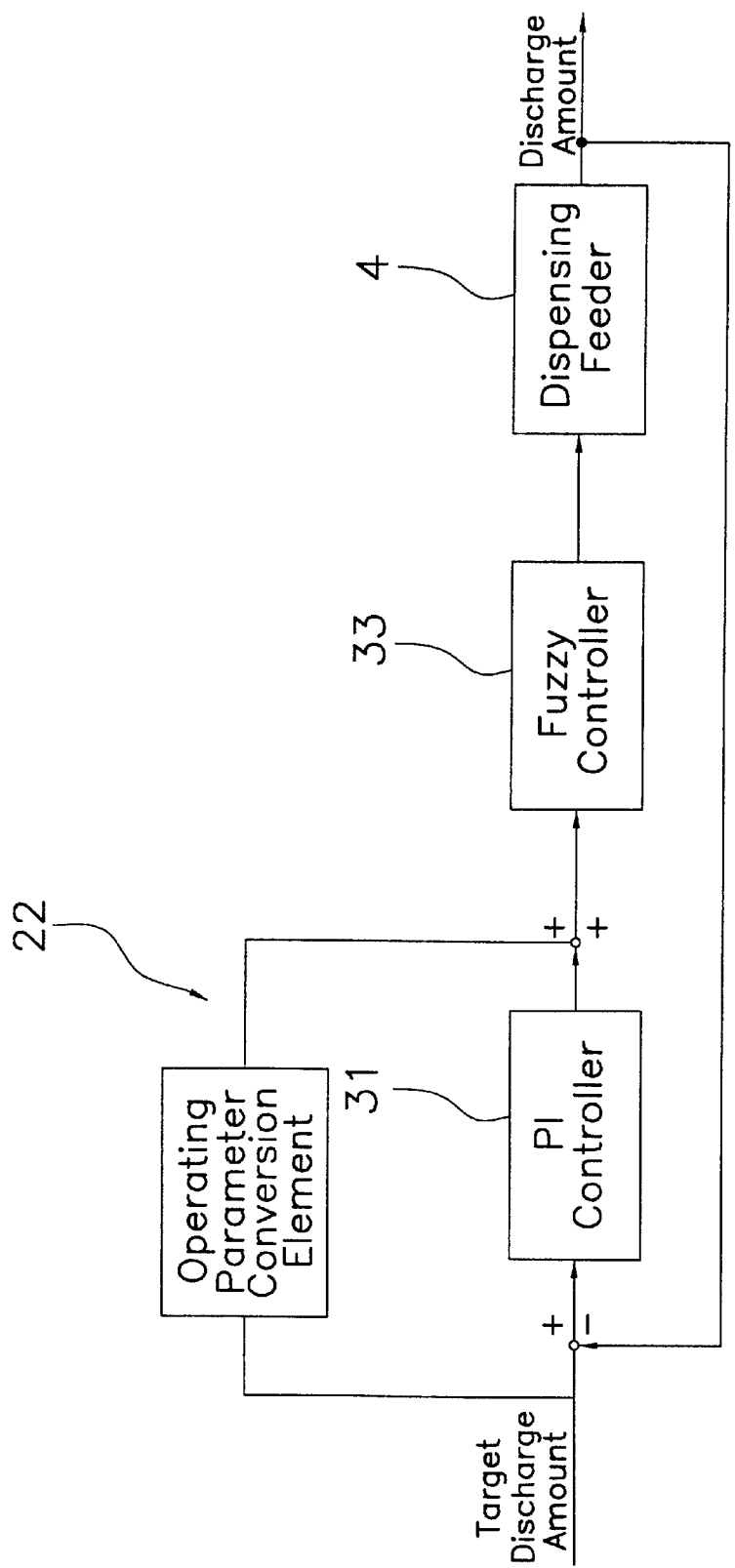
FIG. 5 is a control diagrammatical view of the DF operating parameter calculating unit of FIG. 4 with a fuzzy controller.

FIGS. 3 to 5 illustrate various examples of the feedback control system of the DF operating parameter calculating unit 22. FIG. 3 shows an example of feedback control only with a PI proportional and intergral controller 31. The target discharge amount obtained by converting the target weight entered with the remote control 25 and its deviation from the discharge amount serving as the operating parameter are given to the PI controller 31 as the control signals. The PI controller 31 then gives a suitable operating parameter to the dispensing feeder 4 to be controlled, such that a discharge amount matching the target value is discharged.

In FIG. 4, an operating parameter conversion element 32, which is a function of discharge amount and operating parameter, is added to the operating parameter as a feed-forward element, in addition to the configuration shown in FIG. 3. With the operating parameter conversion element 32, the discharge amount is regulated to the vicinity of the target value, so that the PI controller can compensate for discrepancies in relatively small amount of time.

In FIG. 5, a fuzzy controller 33 is provided between the PI controller 31 and the dispensing feeder 4, in addition to the configuration shown in FIG. 4. The fuzzy controller 33 performs fuzzy control on the operating parameter received from the prior stage, and gives the final operating parameter to the dispensing feeder 4. Adding fuzzy control as disclosed in Japanese Patent No. 2683651, the fuzzy controller 33 prevents oversensitiveness due to disturbances. As described above, the DF operating parameter calculating unit 22 can be realized by fuzzy control PI control or feed-forward control, or by a combination of these.

Referring to FIG. 2, the following is an explanation of the feedback control mode in the dispensing feeder 4. This mode is performed while the supply of articles from the supply device 2 to the dispensing feeder 4 is stopped, and it is not performed while articles are being supplied.

The discharge amount calculating unit 24 measures the weight on the dispensing feeder 4 before and after a weighing cycle, and calculates the amount of articles discharged in each cycle from the difference. More specifically, every time the discharge amount calculating unit 24 receives a signal from a combination control unit (not shown in the drawings) that the weighing cycle has been terminated, the discharge amount calculating unit 24 measures and stores the weight on the dispensing feeder 4. Then the discharge amount calculating unit 24 calculates the difference between the current weight and the previous weight, and passes the result of this calculation to the DF operating parameter calculating unit.

In this mode, articles are not supplied to the dispensing feeder 4, so that the weight of the articles only decreases, and the discharge amount calculating unit 24 can precisely obtain the discharge amount for each weighing cycle.

The discharge amount calculating unit 24 compares the discharge amount with a target discharge amount, and supplies the deviation signal to the PI controller 31 shown in FIGS. 3, 4 and 5. The PI controller 31 gives a suitable operating parameter to the dispensing feeder 4 to be controlled, such that a discharge amount matching the target value is discharged.

Referring again to FIG. 2, while articles are supplied from the supply device 2 to the dispensing feeder 4, the operating parameter given to the dispensing feeder 4 is kept at the operating parameter of the final stage when the supply has been stopped.

With the combinational weighing or counting apparatus 1 of the present invention, the discharge amount of the weighed articles is controlled on the basis of the amount of weighed articles discharged from the dispensing feeder 4, so that the dispensing feeder can be suitably controlled, and superior transport of the weighed article is possible. The following is a description of the specific effects.

(1) The responsiveness of the dispensing feeder 4 is improved, and the time until reaching a stationary state after the operating conditions have been renewed is shortened. Furthermore, there are usually variations in the transporting state because the transporting of the articles does not linearly follow the control signals, but in such cases, the system of the present invention reacts to the variations and returns to the stationary state in a short time.

For example, in the prior art, if there is a small amount of articles in the entire transport path in the initial stage after renewing operating conditions, conventional apparatuses are slow at determining the discharge amount from the dispensing feeder. Conventional apparatuses determine that the discharge amount is small only after the supplied amount of articles is still small after the operating parameters of the radial feeders have been increased, and only then do the conventional apparatuses increase the operating parameter of the dispensing feeder. Consequently, the responsiveness is poor, and it takes a relatively long time to reach the stationary state. On the other hand, in the same case with the configuration of the present invention, when it is detected that the discharge amount from the dispensing feeder 4 is small, and the operating parameter of the dispensing feeder 4 is immediately increased, thereby increasing the discharge amount.

(2) Optimum control of the dispensing feeder 4 becomes possible. For example, if the weighing value of the weighing hoppers 7 varies, it can be determined that the reason for that is the dispensing feeder 4, and in this case, the amount loaded into the weighing hoppers 7 can be adjusted to a suitable value by controlling the dispensing feeder 4 accordingly.

(3) It is possible to control the dispensing feeder 4 at each weighing cycle, thereby enabling a finely tuned control adapted to the present state.

(4) The entire transported amount at the first portion of the transport path can be controlled, so that an overall stabilized transport is possible, even when there are variations in the transport amount at the radial feeders 5, for example.

Application Examples (1) In the above embodiment, the control of the operating parameter of the dispensing feeder 4 is carried out only when the supply of articles from the supply device 2 to the dispensing feeder 4 is stopped. However, it is also possible to control the operation of the dispensing feeder 4 with the RF operating parameter calculating unit 21 while the articles are being supplied.

(2) It is possible to control the operation of the dispensing feeder 4 with the DF operating parameter calculating unit 22 and the RF operating parameter calculating unit 21 while the supply of articles is stopped. In that case, the operation of the dispensing feeder 4 can be controlled, for example, in accordance with a suitable order of priority of the calculating units 21 and 22. As a result, it is possible to suitably control the dispensing feeder 4 also in accordance with the transport situation of the articles further downstream.

Other Embodiments

Figure 6:
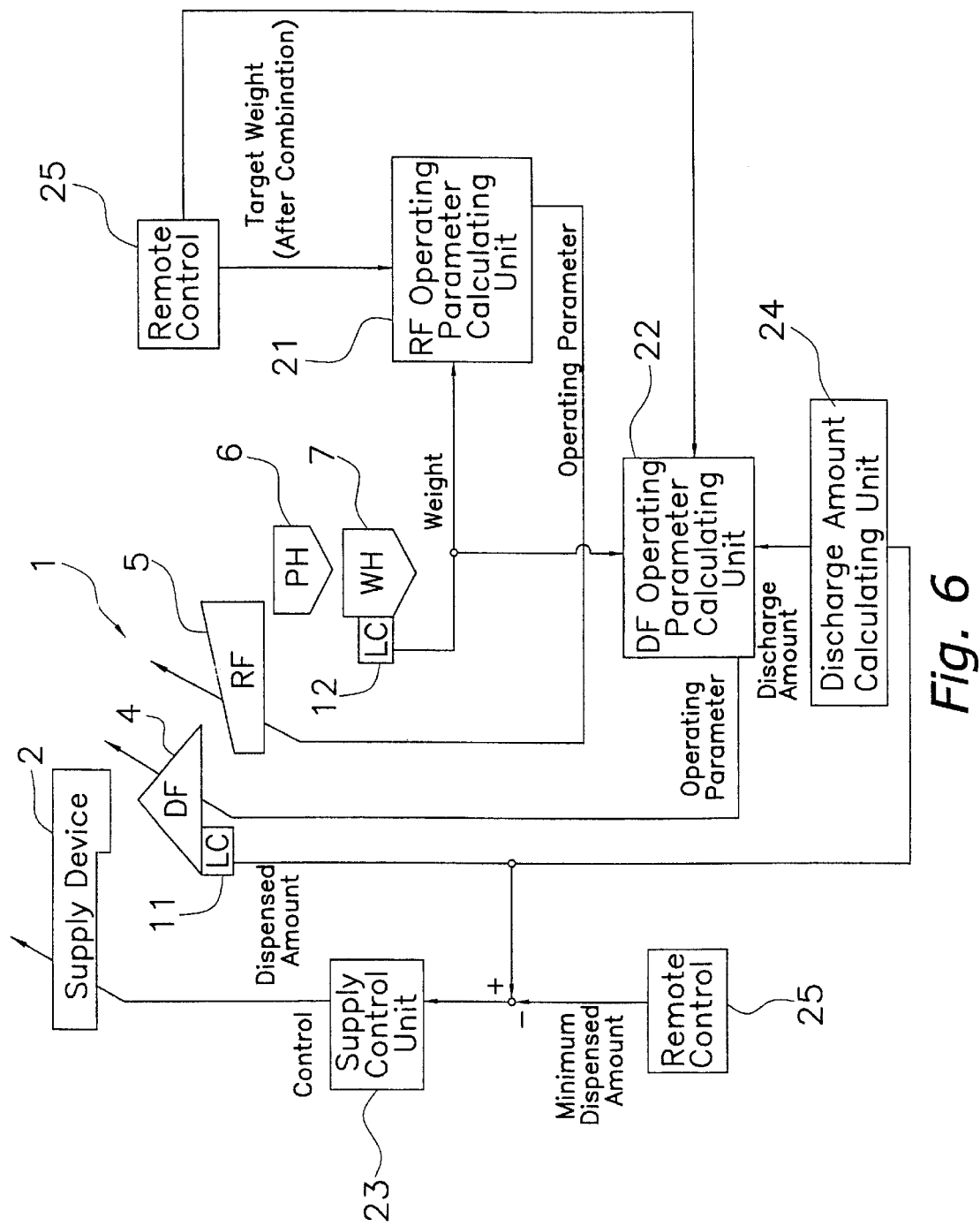
FIG. 6 is a control diagrammatical view of a combinational weighing or counting apparatus in accordance with an alternate embodiment of the present invention.
Figure 7:
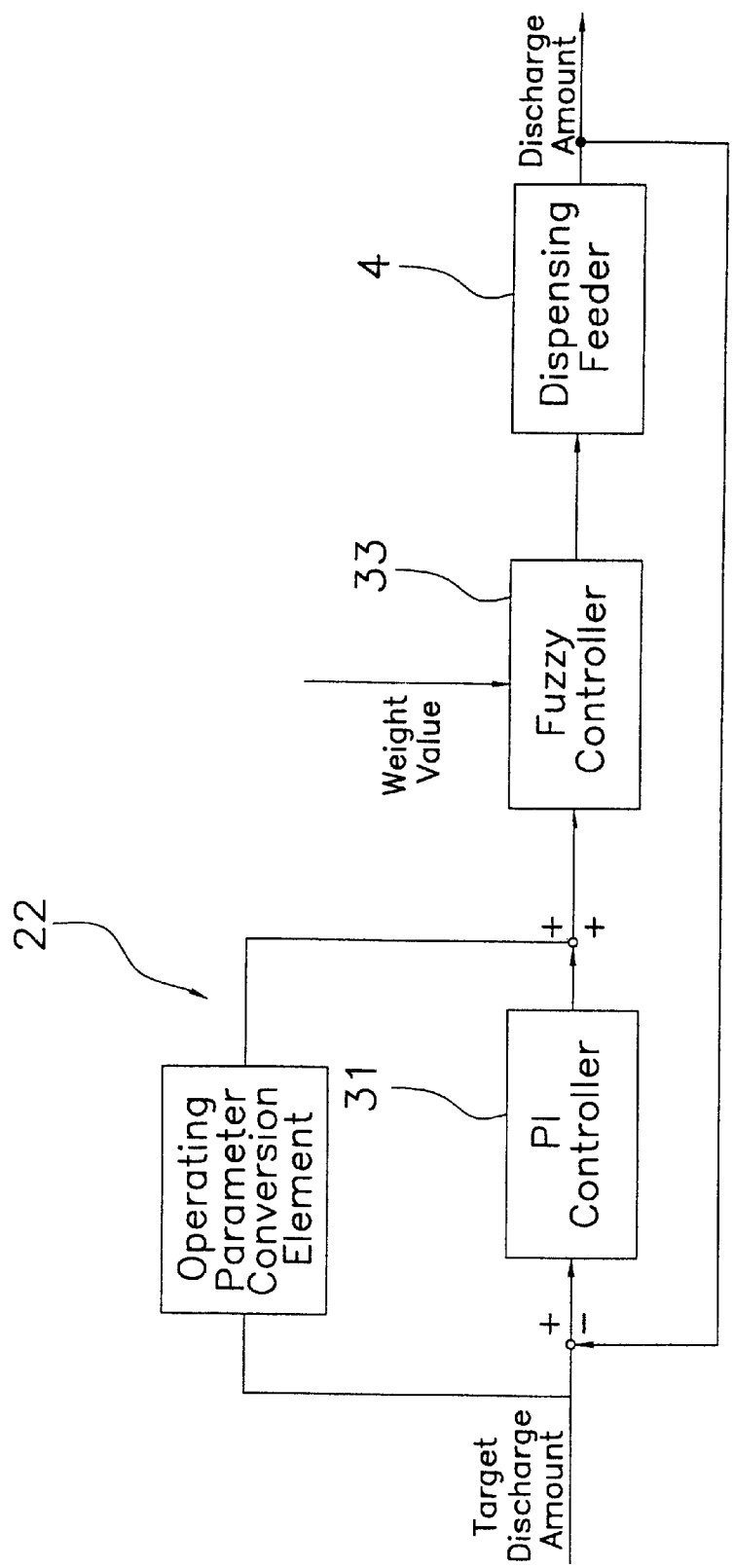
FIG. 7 is a control diagrammatical view of a DF operating parameter calculating unit in accordance with the alternate embodiment of the present invention.

FIG. 6 shows the configuration of the control system of the combinational weighing or counting apparatus 1 in another embodiment. In this configuration, in addition to the configuration of the above-described embodiment, the weight value from the weighing devices 12 of the weighing hoppers 7 is supplied to the DF operating parameter calculating unit 22. That is to say, the DF operating parameter calculating unit 22 can can control the dispensing feeder 4 under consideration of the weight value from the weighing devices 12 of the weighing hoppers 7 in addition to the weight information from the weighing device 11 of the dispensing feeder 4. As a specific configuration of the DF operating parameter calculating unit 22 as shown in FIG. 7, the weight value from the weighing devices 12 is given into a fuzzy controller 33, and the operating parameter of the dispensing feeder 4 is corrected. As a result, it is possible to control suitably the dispensing feeder 4 in accordance with the transport situation of the articles further downstream.

In the previous two embodiments, the weighing values are given directly to the RF operating parameter calculating unit and the DF operating parameter calculating unit in FIGS. 2 and 6. It is also possible to enter the weighing values into the remote control, and to output them from the remote control to the two operating parameter calculating units.

It should be noted that there is no limitation to the previous two embodiments regarding the shapes and the position of the dispensing feeder and the radial feeders. For example, the present invention can also be applied to a so-called linear array combinational weighing or counting apparatus, in which the dispensing feeder is changed to the shape of the radial feeders, and a plurality of radial feeders and weighing hoppers are arranged on the discharge side of the dispensing feeder.

Effect of the Invention

With the combinational weighing or counting apparatus of the present invention, the discharge amount of articles from a dispensing portion is controlled using a weight detection means provided in the dispensing portion. Thus, the dispensing portion can be controlled suitably, and superior transport of the weighed articles can be attained.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A combinational weighing or counting apparatus comprising:
    a dispensing portion to which articles to be weighed are supplied;
    a plurality of weighing hoppers to which the articles are supplied from said dispensing portion;
    weight detection means to detect the weight of the articles on said dispensing portion; and
    control means to control an amount of articles discharged from said dispensing portion, based on weight information from said weight detection means.

2. A combinational weighing or counting apparatus as set forth in claim 1, wherein
    based on the amount discharged, said control means calculates the amount of articles discharged from said dispensing portion using weight information from said weight detection means, and controls the amount of articles discharged from said dispensing portion.

3. A combinational weighing or counting apparatus according to claim 2, wherein
    said control means controls the amount of articles discharged from said dispensing portion, based on said weight information from said weight detection means while a supply of articles onto said dispensing portion is stopped.

4. A combinational weighing or counting apparatus according to claim 3, wherein said control means controls the amount of articles discharged from said dispensing portion, based on weight information from said weighing hoppers, in addition to said weight information from said weight detection means.

5. A combinational weighing or counting apparatus according to claim 4, wherein
said control means controls the amount of articles discharged from said dispensing portion, based on said weight information from said weight detection means for each weighing cycle.

6. A combinational weighing or counting apparatus according to claim 5, further comprising a supply device supplying the articles to said dispensing portion,
wherein said control means controls said supply device, based on weight information from said weight detection means.

7. A combinational weighing or counting apparatus according to claim 2, wherein
said control means controls the amount of articles discharged from said dispensing portion, based on weight information from said weighing hoppers, in addition to said weight information from said weight detection means.

8. A combinational weighing or counting apparatus according to claim 7, wherein
said control means controls the amount of articles discharged from said dispensing portion, based on the weight information from said weight detection means for each weighing cycle.

9. A combinational weighing or counting apparatus according to claim 8, further comprising a supply device supplying the articles to said dispensing portion,
wherein said control means controls said supply device, based on weight information from said weight detection means.

10. A combinational weighing or counting apparatus according to claim 1, wherein
said control means controls the amount of articles discharged from said dispensing portion, based on said weight information from said weight detection means while a supply of articles onto said dispensing portion is stopped.

11. A combinational weighing or counting apparatus according to claim 10, wherein
said control means controls the amount of articles discharged from said dispensing portion, based on weight information from said weighing hoppers, in addition to said weight information from said weight detection means.

12. A combinational weighing or counting apparatus according to claim 11, wherein
said control means controls the amount of articles discharged from said dispensing portion, based on said weight information from said weight detection means for each weighing cycle.

13. A combinational weighing or counting apparatus according to claim 12, further comprising a supply device supplying the articles to said dispensing portion,
wherein said control means controls said supply device, based on weight information from said weight detection means.

14. A combinational weighing or counting apparatus according to claim 1, wherein
said control means controls the amount of articles discharged from said dispensing portion, based on weight information from said weighing hoppers, in addition to said weight information from said weight detection means.

15. A combinational weighing or counting apparatus according to claim 14, wherein
said control means controls the amount of articles discharged from said dispensing portion, based on said weight information from said weight detection means for each weighing cycle.

16. A combinational weighing or counting apparatus according to claim 15, further comprising a supply device supplying the articles to said dispensing portion,
wherein said control means controls said supply device, based on weight information from said weight detection means.

17. A combinational weighing or counting apparatus according to claim 1, wherein
said control means controls the amount of articles discharged from said dispensing portion, based on said weight information from said weight detection means for each weighing cycle.

18. A combinational weighing or counting apparatus according to claim 17, further comprising a supply device supplying the articles to said dispensing portion,
wherein said control means controls said supply device, based on weight information from said weight detection means.

19. A combinational weighing or counting apparatus according to claim 1, further comprising a supply device supplying the articles to said dispensing portion,
wherein said control means controls said supply device, based on weight information from said weight detection means.

* * * * *